Aug. 25, 1936.   W. LYTTON   2,052,099
POSTURE MEASURING EQUIPMENT
Filed July 17, 1933   3 Sheets-Sheet 3
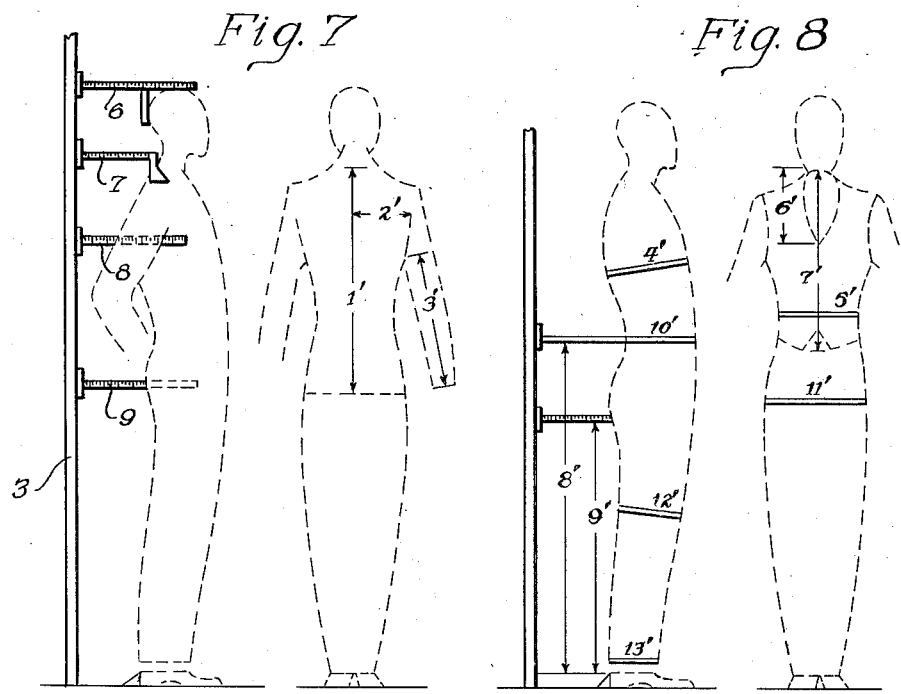
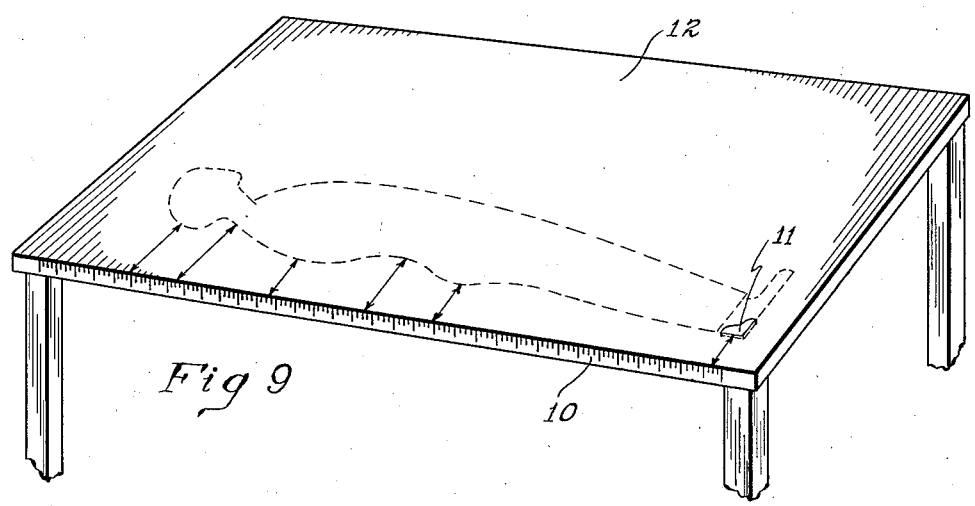
Inventor
Walter Lytton
attys.

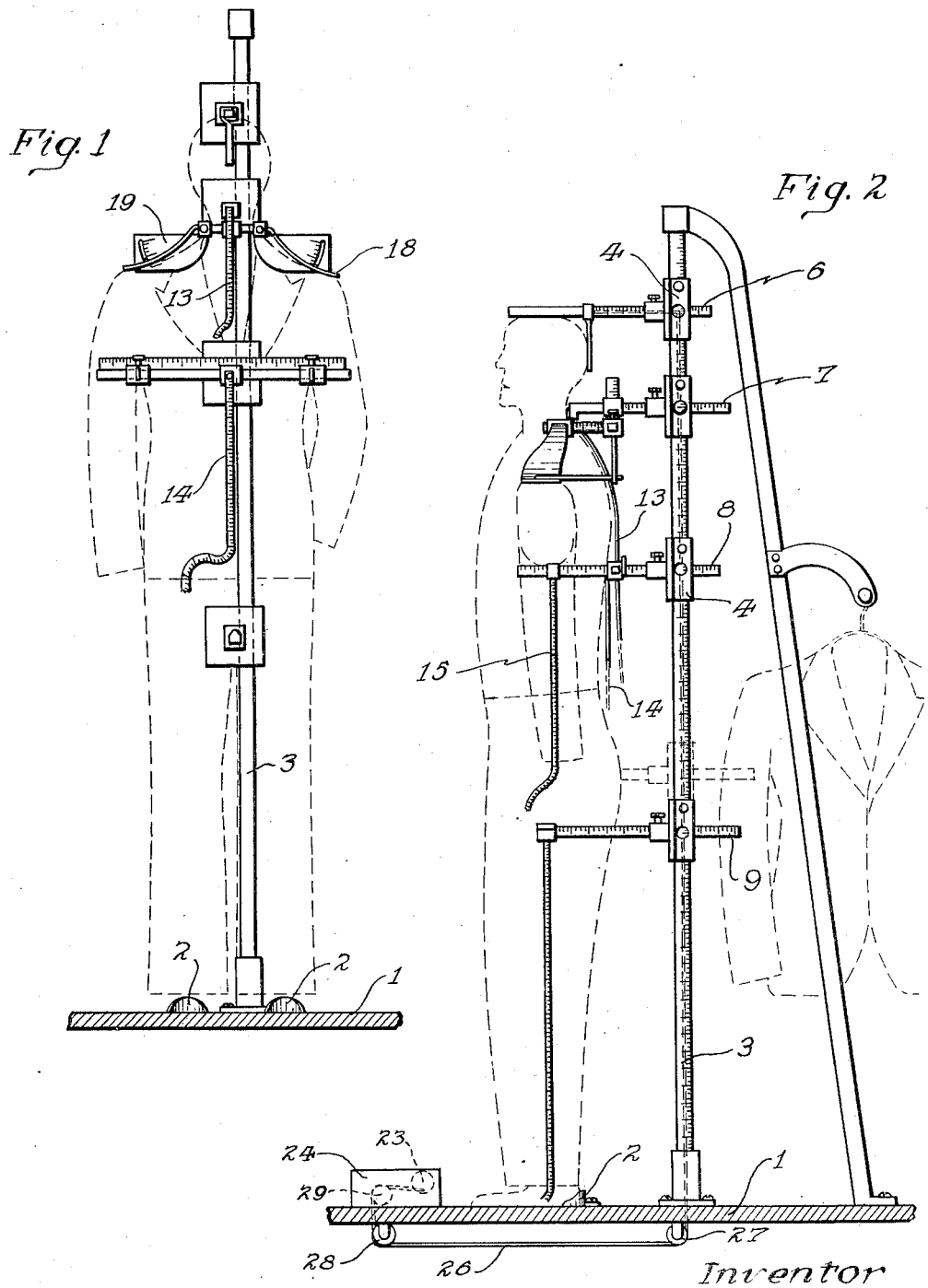

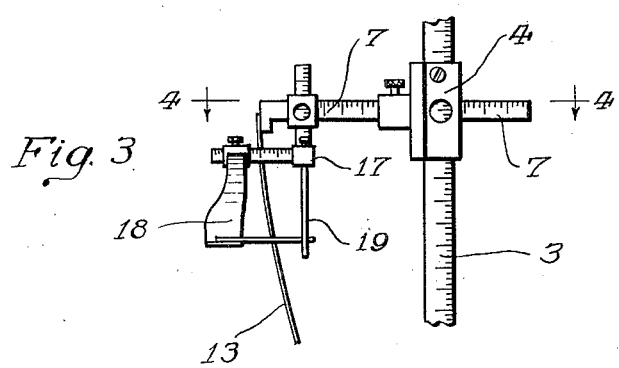
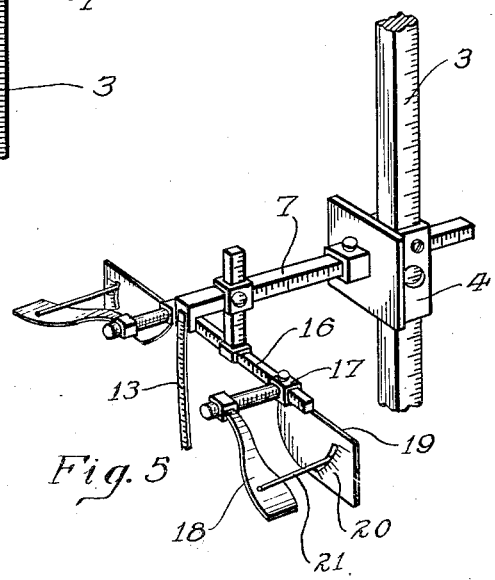
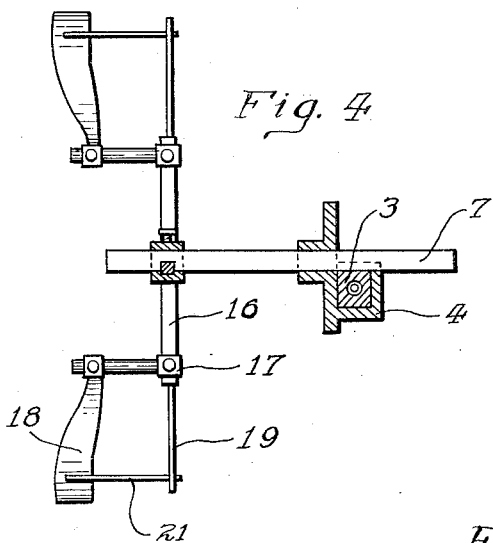
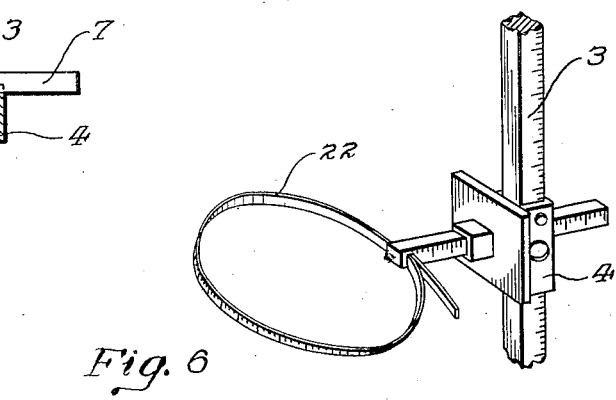

Patented Aug. 25, 1936

2,052,099

UNITED STATES PATENT OFFICE 2,052,099

POSTURE MEASURING EQUIPMENT

Walter Lytton, Chicago, Ill.

Application July 17, 1933, Serial No. 680,755

2 Claims. (Cl. 33—8)

This invention relates to measuring means for use in the making or alteration of garments.

The purpose of the invention is to provide for taking measurements with reference to some fixed point, such as the heels of the one being measured, in order to enable the fitting of a garment according to posture as well as according to dimensions ascertained either by means of a tape measure or constructions having vertically shiftable measuring elements with or without tape measure attachments. Other purposes of the invention are to provide an improved shoulder measuring means for measuring devices of this class and also automatically shifted type for making printed records of some of the measurements.

The purposes of this invention are accomplished by means of a construction such as illustrated by the drawings, in which Figure 1 is a view in front elevation of the improved equipment.

Fig. 2 shows the construction in side elevation.

Fig. 3 is a view in side elevation of a shoulder measuring means.

Fig. 4 is a plan view of the construction shown in Fig. 3 and is partly in section as indicated by the line 4—4 of Fig. 3.

Fig. 5 is a perspective detail of the shoulder measuring device.

Fig. 6 is a perspective detail of a device for making annular measurements such as of the lower hem of a skirt.

Figs. 7 and 8 are diagrams illustrating the use of the equipment for ascertaining the customary dimensional measurements used in tailoring.

Fig. 9 is a perspective view illustrating a method of locating by markings or patterns the angular relationship of the measurements according to posture.

The construction provided by this invention is intended to overcome the usual difficulties arising in the fitting of clothing, particularly men's clothes, due to the general posture, position of the head, angle of the shoulders, irregularities or other departures from an average or standard figure. The construction is accordingly arranged for taking all of the customary measurements for garment fitting, but, in addition, provides for the correct location of such measurements with reference to each other and some fixed point such as the heels of the figure to be fitted. Thus the correct angular relationship of the shoulders, hips, knees, etc., may be defined in a pattern.

As shown in the drawings, the construction includes a base 1 carrying half-round flanged heel fitting plates 2 and a measuring standard 3 having a plurality of slides 4 which carry laterally shiftable gauges such as 6, 7, 8 and 9, shown in Fig. 2. The standard 3 and the heel engaging flanges 2 are located apart the same distance as the edge 10 and an inlay 11 of table 12, Fig. 9. Measurements taken by the gauges 6, 7, 8 and 9 from the figure to be fitted are either marked on table 12 or located by patterns placed thereon with reference to rule edge 10 and inlay 11 in correspondence with such measurements with reference to the measuring standard 3 and heel fitting flanges 2.

The gauges, which are adjustably carried by the slides 4, carry measuring tapes such as indicated by 13, 14 and 15, for taking linear or annular measurements from reference points on the gauges. These measurements are the customary ones used in tailoring, as indicated by the numbers 1' to 13' inclusive, Figs. 7 and 8.

The gauge 7, which is detailed in Figs. 3, 4 and 5, supports a shoulder locating device 16. This device carries laterally shiftable measuring element 17 for ascertaining the width of the shoulders and each of these members carries an oscillating wing 18 and a relatively fixed plate 19 which is provided with arcuate markings 20. A pointer 21 indicates on the markings 20 the slope of a shoulder when the wing 18, which carries it, is rocked downwardly to shoulder engaging position.

For the purpose of making annular measurements such as required for the fitting or manufacture of a skirt, one of the gauges, as illustrated by Fig. 6, carries an adjustable steel measuring tape 22.

The vertical adjustment of the gauge carrying slides 4 is transmitted to adjustable type carriers 23 housed in a casing 24 mounted upon platform 1. This casing contains necessary inking and impression mechanism not shown, for providing a permanent record on cards or other means, and the type carriers, which may be any suitable and well known means such as wheels or racks having type or dies formed thereon, are differentially adjusted according to the setting of slides 4 by means of wires or cables 26 attached to the slides and passing around pulleys 27 and 28 and operating reduction gearing 29 against spring action. These gears are arranged to operate the type carriers and adjust them so that the position of the slides 4 relative to a fixed starting point will be accurately recorded. This mechanism is not shown in detail since its construction forms no part of this invention, and many well known devices are suitable for the herein described purposes.

In making use of this measuring device, the person to be fitted stands on platform 1 with his heels engaging flanges 2, and the measurements are taken according to the individual's normal posture. The fixed reference elements for these measurements are the plates 2 and the standard 3 and the measurements are located upon the drawing table 12 with reference to the inlay 11 corresponding to the heel flanges 2 and the straight edge 10 corresponding with standard 3.

In the usual tailoring practice standardized patterns are employed in cutting out the garments and these patterns are provided for various height and circumferential measurements of normal or average figures of normal or average posture. These patterns are usually altered only to accommodate height and circumferential variations or to fit in-between sizes. No serious attempt can be made to alter the pattern or cut to accommodate individual posture peculiarities and this feature is of utmost importance if figures that vary from the normal, or average, are to be properly fitted and if the hang of the garments is to tend to make the abnormal figure appear normal.

In the case of tailor made garments, alterations to fit and hide individual posture variations are made by the tailor by fitting the garments to the specific figure during the course of the assembly of the cut pieces. But even this alteration is usually done after the garment is cut. Such alteration for posture variations is obviously impossible in the case of factory made garments unless the cutter has an accurate picture of the specific figure to be fitted and such a picture cannot be had from mere angularly unrelated dimensions or measurements and only a few notes that simply describe the major posture peculiarities with no reference to the degree of peculiarity relative to some common or basic point from which the angular relationships can be visualized.

By means of the herein described apparatus and method of fitting to individual posture requirements, wherein all measurements and the angular relationships thereof are based upon a common and known reference point it is possible for the cutter to accurately reproduce the exact posture peculiarities of the figure to be fitted and in this way accurately alter the standardized patterns before cutting, or the cutting of the cloth, so as to accommodate the peculiarities and hide them to make the figure appear normal—the while producing a garment of perfect fit and proper style or appearance. The measurements taken on the measuring device with reference to a known and common base point and then laid out on the cutting table from a fixed point thereon corresponding exactly with the said base point, admit of no errors in either the pattern or the cut of material; and a posturized or tailored-to-fit garment may thus be produced in a central manufacturing plant to accurately fit any individual no matter how remotely that individual may be located.

It is found that a better fitting product is attainable by use of this measuring equipment, and many of the errors frequently occurring through use of the customary means and methods of garment fitting are avoided, and due to the avoidance of such errors the cost of refitting and alterations is lessened.

It is to be understood that details of the construction shown may be altered or omitted without departing from this invention as defined by the following claims:

I claim:

1. In measuring equipment of the class described, a platform having feet positioning means on its upper surface, a vertical standard supported by said platform and offset a predetermined distance from said feet positioning means, a plurality of measuring elements slidable upon said standard and arranged to locate various points on a figure with reference to said feet positioning means, differentially adjustable recording means arranged in a casing, and cables connecting said recording means with said measuring elements whereby said recording means are shifted according to the movements of said measuring elements.

2. A posture measuring equipment comprising a platform having fixed feet positioning means on its upper surface, a vertical standard on said platform positioned a predetermined fixed distance away from said feet positioning means, and a plurality of measuring elements mounted slidably on said standard and arranged to locate various points on the profile of a figure with reference to said standard and to positively relate such points to said feet positioning means.

WALTER LYTTON.